United States Patent [15] 3,659,275

Marshall [45] Apr. 25, 1972

[54] MEMORY CORRECTION REDUNDANCY SYSTEM

[72] Inventor: Melvin R. Marshall, Wappingers Falls, N.Y.

[73] Assignee: Cogar Corporation, Wappingers Falls, N.Y.

[22] Filed: June 8, 1970

[21] Appl. No.: 44,253

[52] U.S. Cl. ....................340/173 R, 340/172.5, 340/173 SP

[51] Int. Cl. ..................G11c 29/00, G11c 9/00, G06f 11/08

[58] Field of Search..................340/173 R, 173 SP, 173 AM, 340/172.5

[56] References Cited

UNITED STATES PATENTS

| | | | |
|---|---|---|---|
| 3,245,052 | 4/1966 | Lewin | 340/173 R |
| 3,551,900 | 12/1970 | Annis | 340/173 R |
| 3,365,707 | 1/1968 | Mayhew | 340/173 R |
| 3,093,814 | 6/1963 | Wagner | 340/173 R |
| 3,560,942 | 2/1971 | Enright, Jr. | 340/173 R |
| 3,434,116 | 3/1969 | Anacker | 340/172.5 |
| 3,585,607 | 6/1971 | De Haan | 340/173 |

*Primary Examiner*—Bernard Konick
*Assistant Examiner*—Stuart Hecker
*Attorney*—Harry M. Weiss

[57] ABSTRACT

A system is described in which at least one read-only memory having permanently stored data therein is accessed in parallel with a correction or redundant memory element. The data from the correction or redundant memory element contains at least one tag bit which determines whether the data from the read-only memory or from the correction (or redundant) memory element is to be provided at output terminals.

2 Claims, 1 Drawing Figure

INVENTOR
MELVIN R. MARSHALL
BY Harry M Weiss
ATTORNEY

MEMORY CORRECTION REDUNDANCY SYSTEM

FIELD OF THE INVENTION

This invention relates generally to memory systems and, more particularly relates to a memory system for substituting data provided by at least one memory element with data from a correction or redundant memory element.

BACKGROUND OF THE INVENTION

In the past, memory systems were designed to provide an output in response to a given address. Hence a memory system's reliability and accuracy depended upon the ability of the memory to perform its memory storage function without error or breakdown of any of the storage elements of the memory system. However, many memory systems developed errors or breakdown of individual storage elements either initially or during the course of operation. As a result, it was costly and time consuming to repair these memory systems in the field. Especially, in those cases where the memory systems were quite large, it was a real problem to find the error or breakdown and correct or repair the system.

Particularly, in the case of very large read-only memory systems which had memory elements in a preset or fixed state to provide an automatic data output response to a given address input, a need existed for a technique for either correcting errors (or memory storage element breakdowns) or providing a redundant backup or substitution arrangement. Also, in the event a change is desired in a preset read-only memory system, a need existed for providing such a change without replacing the read-only memory system.

Read-only memory elements can now be produced on single semiconductor chips with over a thousand bits of information stored thereon. Normally these memory elements are word-organized so that the memory element with, for example, 1,024 or $2^{10}$ bits thereon may provide 128 or $2^7$ different eight bit words on a set of eight output leads in accordance with signals applied to seven input or address leads.

Often a system is designed and produced employing a number of such read-only memory elements interconnected to provide an even larger read-only memory. Usually each memory element in a read-only memory has a different predetermined data pattern stored therein. After a considerable expense is incurred in designing and producing masks for manufacturing a particular semiconductor memory element for example, it is not uncommon that one or more of the data words therein must be changed. When this occurred, in the past, it was necessary to start the process of either designing or correcting the memory system.

BRIEF DESCRIPTION OF THE INVENTION

In accordance with one embodiment of this invention, a read-only memory system is provided in which a memory means for storing information or read-only memory element is accessed in parallel with a correction memory element. The correction memory element is a substitutional memory means for providing information in lieu of information located in the read-only memory element. The correction memory element provides one bit more than the read-only memory element. The additional bit is employed to disable an output signal from the parallel accessed read-only memory element and substitutes an output signal from the correction memory element therefor. Accessing means, in the form of an address arrangement, is provided for selectively accessing information located in the read-only memory and the substitute or correction memory.

The foregoing, and other objects, features and advantages of the invention, will be apparent from the following, more particular description of the preferred embodiment of the invention, as illustrated in the accompanying drawings.

DETAILED DESCRIPTION

Figures 1, 2:
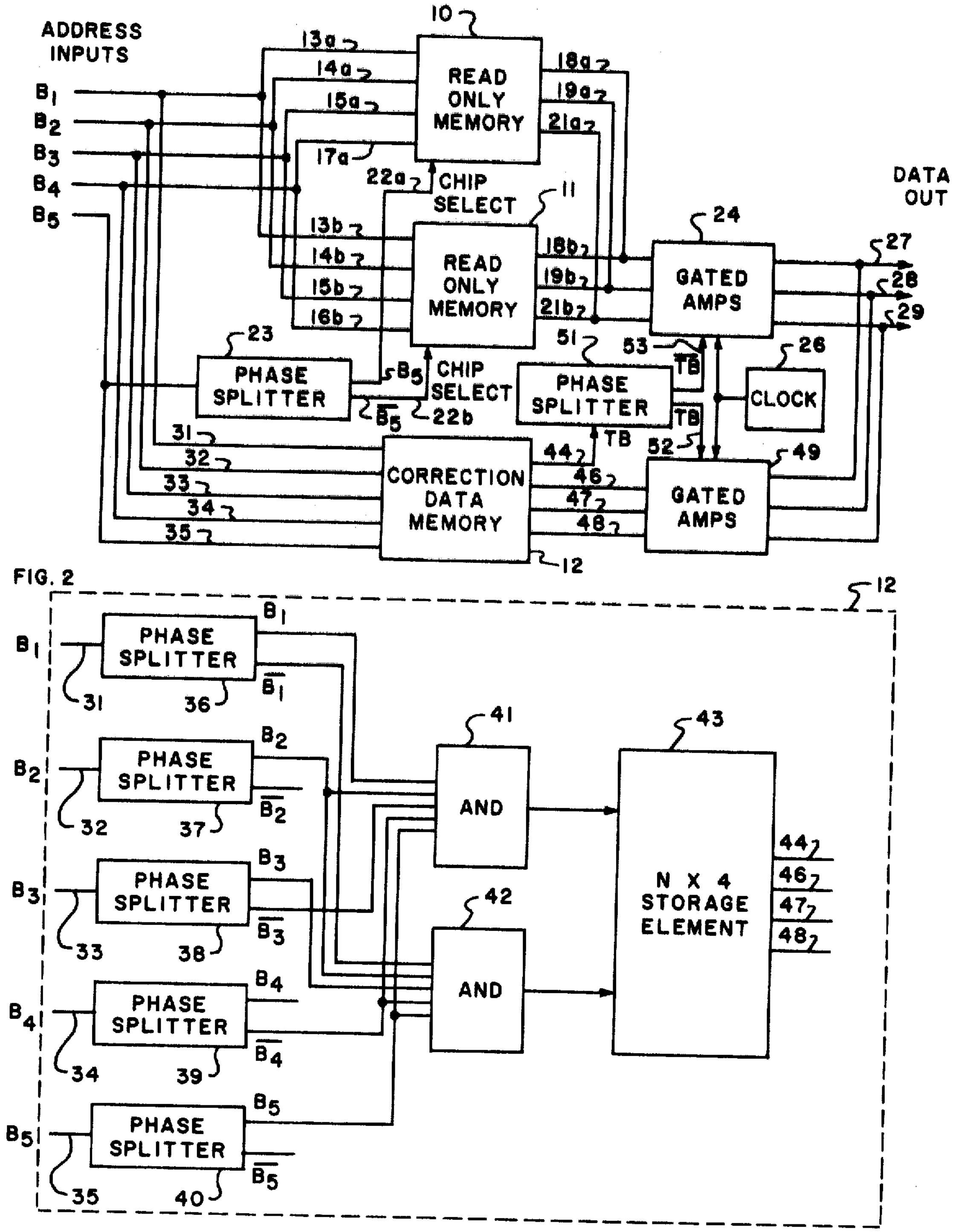
FIG. 1 is a block diagram showing a system embodying the principles of this invention.
FIG. 2 is a block diagram of the correction data memory element shown in FIG. 1

Referring now to FIG. 1, a read-only memory, preferably a semiconductor memory system, is provided which includes a pair of read-only memory elements 10 and 11 and a correction data memory element 12. Each of the read-only memory elements 10 and 11 are word-organized, having, for example, 32 address locations each containing a three bit data word. Four address input terminals, **13*a*, 14*a*, 15*a*, 17*a* and 13*b*, 14*b*, 15*b* and 16*b* are employed for accessing to three bit data words. When a predetermined address input code is applied, for example, to the input address terminals 13*a*, 14*a*, 15*a* and 17*a* of the memory element 10, a fixed three bit data word appears at output terminals 18*a*, 19*a* and 21*a*** thereof.

In a like manner, predetermined address input codes applied to the address input terminals **13*b*, 14*b*, 15*b* and 16*b* of the memory element 11 provide specific output signals on output terminals 18*b*, 19*b* and 21*b***.

Each memory element 10 and 11 has a chip select input address terminal **22*a* and 22*b***, respectively. An enable signal must be applied to the selected chip select address terminal of a chosen memory element in order for any output to appear from that memory element.

The two read-only memory elements 10 and 11 are connected with the input address terminals **13*a*, 14*a*, 15*a* and 17*a* of one connected to the respective input address terminals 13*b*, 14*b*, 15*b* and 16*b* of the other. Similarly, the output terminals 18*a*, 19*a* and 21*a* are connected to the output terminals 18*b*, 19*b* and 21*b*, respectively. A five bit address word, for example, is employed to access the 64 address locations of the two memory elements 10 and 11. Four address lines, B1, B2, B3 and B4 are applied to the interconnected input terminals of the memory elements 10 and 11**.

A fifth address line B5 is passed through a phase splitter 23 to provide a replica thereof to the chip select address terminal **22*a* of the memory element 10 and the complement of B5 to the chip select address terminal 22*b* of the memory element 11. In this way, one type of signal at the input address terminal B5** permits one memory element to be enabled while the other memory element is enabled for the signal's complement thereby providing one unique three bit word from the interconnected output terminals for each one of the 64 possible combinations of input terminals.

It should be clear that any number of memory elements having a different number of address locations and bits per output word can be interconnected in this manner. The numbers chosen in this embodiment have been used for ease of explanation. It should also be clear that an inverting amplifier can be employed as the phase splitter 23.

The output data word accessed by the signals on address terminals B1—B5 is passed through a gated amplifier bank 24, when enabled by a timing clock 26, to data output terminals 27, 28 and 29.

With the present state of semiconductor technology, read-only memory elements such as the read-only memory elements 10 and 11 are each fabricated on a single monolithic integrated semiconductor chip which is either bipolar or unipolar.

In a semiconductor read-only memory chip one cannot rewire the information stored in the memory elements 10 and 11 after they have been fabricated. Further, one cannot gain access to address decoders or sense amplifiers internal to the memory elements 10 and 11.

In accordance with this invention, the three bit word provided at output terminals 27, 28 and 29 in response to a predetermined input signal is applied to terminals B1–B5 by the addition of the correction data memory element 12.

CORRECTION DATA MEMORY ELEMENT

The correction data memory element 12 has five input address terminals connected by leads 31–35 to the address terminals B1–B5, respectively. Each of the address leads 31–35 (see FIG. 2) drives a phase splitter 36–40, respectively. Each phase splitter provides an output pair of signals corresponding to the true and complement of the applied address signal. A pair of five input "and" circuits 41 and 42 are employed in the present correction data memory element 12 to serve as decoders. In this case, the "and" gate 41 decodes the location 11001 while the "and" gate 42 decodes the address location 01101. It should be understood that the phase splitters 36–40 and "and" gates 41 and 42 are merely a decoding circuit arrangement, therefore, any other suitable decoding circuit arrangement can also be used in their place.

When the input word 11001 is applied to the input address terminals B1–B5, "and" gate 41 energizes a storage element 43 to supply a four bit data word on output terminals 44, 46, 47 and 48.

The storage element 43 is preferably a read-only semiconductor memory containing "N" four bit words, where N is any integer. The storage element 43 has one input terminal for each word stored therein; in this example therefor, N is two.

The three bits appearing on leads 46–48 are applied to a bank of gated amplifiers 49 (see FIG. 1) which is also clocked by the timing clock 26 to pass these three bits to the data output terminals 27–29. The fourth bit appearing on terminal 44 is a "tag bit" which controls whether the data from the original memory including read-only memory elements 10 and 11 or the data from the correction data memory elements 12 is to be passed when clocked by the timing clock 26 to the terminals 27–29.

This is accomplished by passing the bit on terminal 44 through a phase splitter 51 which provides an output upon sensing the "tag bit," via lead 52 to the gated amplifier bank 49 and the output's complement to gated amplifier bank 24 via lead 53.

In this embodiment, the "tag bit" is a "1." A "0" tag bit represents no correction and hence, the correction memory element 12 does not control the gated amplifier 24. If desired, suitable control circuitry can be utilized to achieve the same result with a "0" rather than with a "1." It should be clear that many read-only memory elements such as the read-only memory elements 10 and 11 may be connected in parallel. If a number of changes were required in data stored thereon, one additional chip could be manufactured rather than changing all the chips in the system.

While the embodiment of this disclosure is directed to a read-only memory, a read/write memory can also be constructed in accordance with the teachings of this invention. Furthermore, while the Correction Data Memory is described to be a read-only memory element, the practice of this invention can be carried out with a read/write Correction Data Memory for use with either read-only or read/write memory arrangements. Accordingly, the claims are also intended to cover these embodiments.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory system comprising, in combination, memory means for providing a predetermined data word to a set of output terminals in response to each of a plurality of access signals;

correction data memory means for providing a substitute data word to said set of output terminals in response to some of said plurality of access signals;

means responsive to accessing of said correction data memory means for inhibiting said predetermined data word, said correction data memory means provides an "N" bit data word, said memory means provides "N−1" bits serving as said substitute data word, said inhibiting means includes one bit for inhibiting said predetermined data word;

a first bank of gated amplifiers which provide said predetermined data word to said output terminals;

a second bank of gated amplifiers which provide said substitute data word to said set of output terminals; and means responsive to said inhibiting bit which selectively gates said first and second banks of gate amplifiers, wherein said inhibiting bit responsive means is a phase splitter.

2. A memory system as defined in claim 1 including a clock generator for simultaneously enabling said first and second bank of gated amplifiers.

* * * * *